April 3, 1962   E. L. BARCUS ETAL   3,027,807
REMOTELY CONTROLLED MIRROR
Filed Nov. 28, 1958   3 Sheets-Sheet 1

INVENTORS
Edward L. Barcus, &
BY Howard I. Stone
ATTORNEY

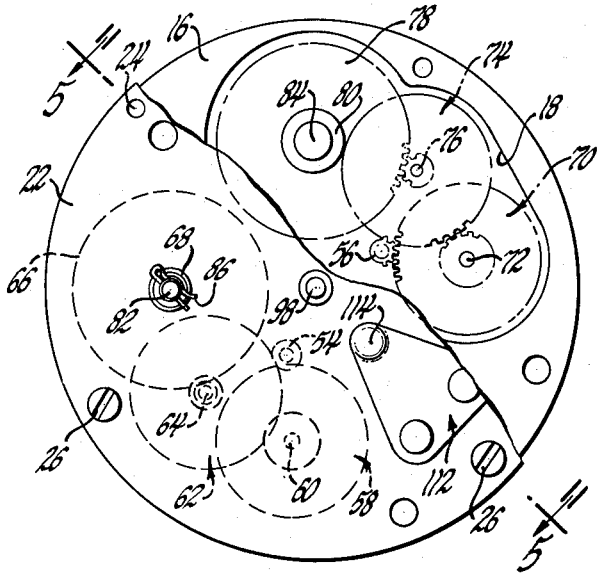

INVENTORS
Edward L. Barcus, &
BY Howard I. Stone
ATTORNEY

United States Patent Office 3,027,807
Patented Apr. 3, 1962

3,027,807
REMOTELY CONTROLLED MIRROR
Edward L. Barcus, Anderson, and Howard I. Slone, Alexandria, Ind., assignors to General Motors Corporation, Detroit, Mich., a corporation of Delaware
Filed Nov. 28, 1958, Ser. No. 777,107
7 Claims. (Cl. 88—93)

This invention pertains to remotely controlled mirror mechanisms and, in particular, to such mechanisms comprising a rear view mirror assembly adapted to be mounted on the exterior of an automotive vehicle and selectively positioned upon movement of an actuator located within the vehicle passenger compartment.

In mirror mechanisms comprising a mirror assembly and a remotely located actuator therefor, many arrangements have been proposed heretofore to operatively connect the actuator and the actuated mirror assembly. The principal proposals have been directed to either a direct solid mechanical connection such as a rod or arm, a plurality of cable members such as Bowden wires, or fluid systems in which fluid under pressure acts on a plurality of piston type actuated members associated with the mirror assembly. However, none of the aforementioned operative connections has been entirely satisfactory for several reasons among which may be included installation difficulties, lack of facility in positively selecting and holding a desired position of mirror assembly adjustment and maintenance considerations.

For example, the aforementioned direct mechanical connection has serious limitations with respect to flexibility of location of the mirror assembly exteriorly of the vehicle. Thus, it is ordinarily possible to mount the mirror assembly only on the exterior panel of the vehicle door structure and connect it by a relatively straight rod to the actuator mounted on the interior panel of the aforementioned door structure inasmuch as a relatively complex linkage would be required to pass without interference beyond various posts and pillars of the vehicle structure if the mirror assembly were to be mounted in another location as, for instance, forwardly on a vehicle fender. Although cable connections solve this problem to some extent, they are often susceptible to some binding action in operation due to being kinked and bent about the structural components of the vehicle in extending between the actuator and the actuated mirror assembly. More importantly, however, such cable connections are very objectionable with respect to variation in the individual cable lengths. In this regard, such cable connections usually consist of three Bowden wires operatively connecting the mirror assembly to the actuator. Due to variation in tolerances in positioning the mirror assembly a distance from the actuator, it usually happens that slack occurs in one or more of the individual cables. As a result, a desired mirror position cannot be positively selected and maintained. With respect to fluid systems, the fluid under pressure compensates for any slack which would be presented in a cable-operated system. However, impositive control again results due to expansion and contraction of the fluid response to temperature and other atmospheric changes. Moreover, such fluid systems are susceptible to leakage thereby resulting in undesired pivoting or adjusting movement of the mirror assembly out of the selected position. Finally, mirror mechanisms constructed in accordance with any of these proposals require a considerable degree of manual dexterity in adjusting the mirror to a desired position, while the mirror is relatively easily displaced from its adjusted position by vibration, shocks or being inadvertently struck.

It is, therefore, a principal object and feature of this invention to provide an improved remotely controlled mirror mechanism which is easily installed in practically any position on a vehicle, requires little if any maintenance, and provides positive selection and retention of mirror position.

It is another object of this invention to provide a remotely controlled mirror assembly of the type aforementioned comprising mirror adjusting actuated means including relatively small and compact reversible electric motor means associated with the mirror assembly, and operatively connected through an actuator switch mechanism to a suitable electrical power source for positively selecting and holding the mirror element in a desired position.

It is yet another object of this invention to provide an electrically operated remotely controlled mirror mechanism of the type aforedescribed which includes an actuator switch mechanism which may be selectively manipulated to position the mirror element at the will of the operator, and which switch mechanism has a self-centering action automatically returning it to a circuit opening or motor deactivating position upon release by the vehicle operator.

It is still another object of this invention to provide an electrically operated remotely controlled mirror mechanism comprising a small and compact electric motor having a pair of armatures rotatably mounted in the field of a single permanent bar magnet, each of said armatures being reversibly operable upon selective actuation of a master actuator switch assembly remotely located from the mirror assembly.

A more specific object of the invention resides in the provision of an actuator switch mechanism comprising a plurality of spaced fixed contacts adapted to energize the aforementioned dual armature motor upon movement of an actuator having a pair of bridging contacts, said bridging contacts being mounted with respect to the actuator and fixed contacts for movement in a predetermined position and paths so as to selectively bridge groups of the fixed contacts in positively positioning the mirror.

In general, these and other objects of the invention are attained in a remotely controlled mirror mechanism comprising a mirror assembly adapted to be suitably supported on the exterior of a vehicle and remotely adjusted to a selected position and maintained therein by an actuator positioned within the vehicle passenger compartment. The mirror assembly includes a relatively small and compact reversible electric motor means including a single permanent bar magnet, two pole shoes and dual armatures connected to drive trains carried by the mirror support. The aforementioned drive trains are adapted to reciprocate plural drive screws operatively abutting the mirror at spaced points defining axes of mirror adjustment. The mirror is universally adjustably mounted on the mirror support, while a yieldable spring member carried by the support abuts the mirror element to urge the latter into engagement with the aforementioned drive screws. An actuator switch member which selectively controls operation of the aforementioned motor means includes a plurality of spaced fixed contacts adapted to be bridged by movable bridging contacts which move in a predetermined position with respect to each other and predetermined paths to selectively bridge the required fixed contacts for controlling operation of the motor means in the desired direction. Moreover, a self-centering spring acts automatically upon release of the actuator mechanism to return the bridging contacts to a circuit-opening position thereby holding the mirror in an adjusted position.

The nature and function of the structure by which the foregoing objects are achieved will become more apparent hereinafter as the description of the invention proceeds, and in which reference is made to the following drawings in which:

FIGURE 4 is a view, partly in section and partly broken away to illustrate certain details, taken on line 4—4 of FIGURE 2;

FIGURE 5 is a section, slightly enlarged, taken on line 5—5 of FIGURE 4;

FIGURE 6 is a section taken on line 6—6 of FIGURE 5;

FIGURE 7 is a section taken on line 7—7 of FIGURE 6;

Figure 1:
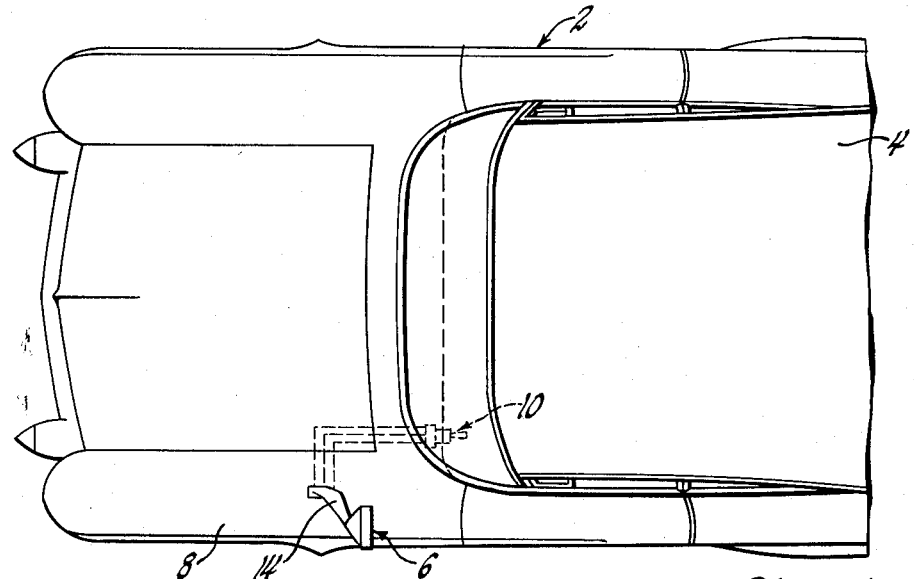
FIGURE 1 is a fragmentary top plan view of an automotive vehicle with which the remotely controlled mirror mechanism of this invention may be employed.

Referring now to FIGURE 1 of the drawings, there is illustrated a conventional automotive vehicle 2 having the usual passenger compartment 4. The mirror assembly 6 is suitably supported on the exterior of the vehicle as on the left front fender 8, and may be selectively adjusted to and held in a desired position by electric motor means to be described connected by the conductors indicated in dotted line to the switch actuator 10 suitably secured within the passenger compartment.

Referring now particularly to FIGURES 2 through 7, the mirror assembly 6 may be seen to include an outer shell-like shroud 12 suitably rigidly secured to a mounting bracket 14 fixed exteriorly of the vehicle. A main housing body or support member 16 includes a cavity or depression 18 terminating in the body rear wall 20. A closure member or plate 22 for the aforementioned cavity 18 is adapted to be located on a small forwardly projecting boss 24 on the peripheral flange of the body or support member 16, and secured to the latter by suitably spaced fasteners 26.

A continuous wall 28 projecting from the rear wall 20 of the body or support member 16 defines a motor cavity 30 adapted to receive the components of reversible electric motor means for controlling the position of the mirror element to be described. A pair of oppositely disposed pole shoes 32 are suitably positioned within the motor cavity substantially contiguous with the motor cavity wall 28, and a permanent bar magnet 34 is seated therebetween in order to separate the motor cavity into two portions for receiving the motor armatures 36 and 38. The relatively small armatures 36 and 38, which are of conventional construction, are mounted within the motor cavity 30 to either side of magnet 34, and a brush housing and motor cavity closure member 40 fabricated from an insulating material and having a radial shoulder 42 seating on the rearward edge of the wall 28 is adapted to be fastened thereto by the spaced fasteners 44. The respective armatures 36 and 38 are rotatably supported within the motor cavity by means of dead axle shafts supported in sleeve-like bearings contained within the brush housing and motor cavity closure 40. Similarly, the respective output shafts 46 and 48 of the armatures 36 and 38 are rotatably supported in the rear body wall 20, and extend through the latter into the body cavity 18. Suitable brushes 50 supported on the insulated housing and closure 40 ride in the usual manner on the respective armatures, and are adapted to be connected to a suitable source of electrical power, such as a vehicle battery, through the actuator switch mechanism to be described. For this purpose, referring particularly to FIGURE 5, it is desirable to connect the brush members 50 electrically to three spaced male connector members 52 (only two of which being shown) adapted to be received by the conventional and well-known female connector block connected to conductors leading to the actuator switch mechanism.

Each of the armature drive shafts 46 and 48 project into the body cavity 18 as aforementioned, and mount the small drive pinions 54 and 56, respectively. Each of the drive pinions 54 and 56 is drivingly associated with a gear train for adjusting the mirror element in a manner to be described. Thus, and referring particularly to FIGURES 4 and 7, the pinion 54 driven by the armature 36 meshingly engages with gear cluster 58 consisting of axially spaced gear elements of relatively large and small diameter rotatably supported on an axle shaft or pin 60 pressed into the body member 16. The small gear element or pinion of cluster 58 drivingly engages gear cluster 62 formed similarly to cluster 58 and rotatably mounted on an axle shaft or pin 64 again pressed into the body member 16. Finally, the small gear element or pinion of cluster 62 drivingly engages a gear wheel 66 carried on a bushing 68 rotatably supported on and between the rear wall 20 of the body member 16 and the closure member 22. It will thus be seen that rotation of the armature 36 in either direction will result in rotation of the gear wheel 66 in a corresponding direction through the drive train comprising pinion 54, gear cluster 58 and gear cluster 62. Moreover, the drive train results in a relatively large gear reduction.

In identical fashion, the small pinion 56 connected with the armature 38 drives through gear cluster 70 rotatably supported on axle or pin 72 and gear cluster 74 rotatably supported on axle or pin 76 to rotate the gear wheel 78 carried on bushing 80 rotatably supported in the same fashion as bushing 68.

Figure 3:
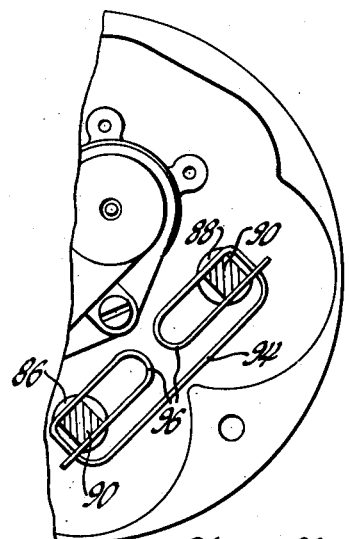
FIGURE 3 is a fragmentary view, partly in section, taken on line 3—3 of FIGURE 2.

The drive screws 82 and 84 are threadably received, respectively, within the bushings 68 and 80 of driving gears 66 and 78. The forward end of each drive screw is apertured so as to receive a retainer and stop member in the form of a cotter key 86. With particular reference to FIGURE 3, the rearward end of each drive screw is headed to form an annular stop shoulder 88 adjacent a clutch surface 90 which is rectangular or otherwise formed with a polygonal cross-section. Each drive screw is bored so as to receive a suitable fastener mounting a retaining washer 92. An integral yieldable wire spring clutch member 94 includes oppositely disposed reversely bent clutch portions 96 which yieldably embrace and seize the clutch surfaces 90 of the drive screws. The purpose of the clutch member 94 is normally to prevent the drive screws from rotating with the respective drive gear bushings resulting therefore in axial reciprocation of the respective drive screws in a direction corresponding to the diection of drive gear rotation. However, the stops 86 and 88 of each drive screw limit axial reciprocation thereof upon abutment with the respective drive gear bushings. Upon engagement of one or the other of these stops, it is necessary that the drive screws be freed for rotation with the respective drive gear bushings so as to prevent the electric motor from burning out or otherwise being damaged. Thus, upon engagement of one of the aforementioned stops, the reversely bent portions 96 of the spring clutch yield to permit the drive screws to rotate with their respective drive gears.

A shouldered mirror mounting pin 98 abuts the forward face of the body cavity closure member 22, and is secured to the latter by a portion extending through the closure member which is turned over or headed. A pivot member 100 having a spherical bearing surface is adapted to be received upon the pin 98 and retained thereon by a yieldable spring lock washer 102. A mirror backing plate 104 has its substantially central portion formed into a socket 106 embracing the pivot member 100 for universal adjustment thereabout, and is adapted to receive the mirror 108. In order to retain the mirror within its backing plate a resilient retaining ring 110 is mounted over mating peripheries of the mirror and its backing plate.

As will be apparent particularly from FIGURE 5, a yieldable spring plate 112 is suitably secured to the closure plate 28, and includes a bearing button 114 at its free end yieldably engaging the rear surface of the mirror backing plate 104 to one side of the axis of mirror adjustment defined by the mounting pin 98. The spring plate 112 continuously urges spaced points on the mirror backing plate, likewise spaced from the axis of mirror adjustment, into abutting engagement with the ends of the respective drive screws 82 and 84.

It will be noted particularly from FIGURE 4 that the respective drive screws 82 and 84 and button bearing portion 114 of the spring plate 112 are spaced substantially 120° from each other. Moreover, the drive screw 82 is positioned in a horizontal plane through the mirror assembly, while the drive screw 84 is located in a vertical plane through the assembly. Thus, as the drive screw 82 is reciprocated in either direction, the mirror 108 will be tilted to the left or right about an axis defined substantially by the drive screw 84 and the button bearing portion 114 of spring plate 112. In similar fashion, reciprocation of the drive screw 84 in either direction results in mirror adjustment up or down about an axis defined by the drive screw 82 and the spring plate 112. Thus, a great range of mirror adjustment is provided. In this regard, it may be noted that the main body or support member 16 may be mounted in other positions within the shroud 12 of FIGURE 2 as is convenient. However, irrespective of the disposition of the main body member 16, two distinct axes of mirror adjustment will exist.

Figure 8:
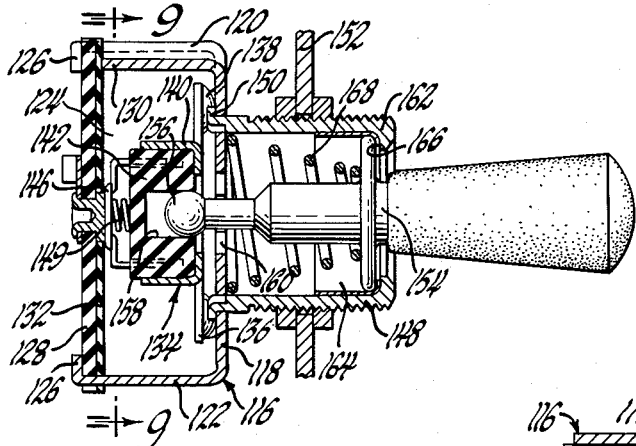
FIGURE 8 is an enlarged longitudinal section through the actuator of FIGURE 1.
Figure 9:
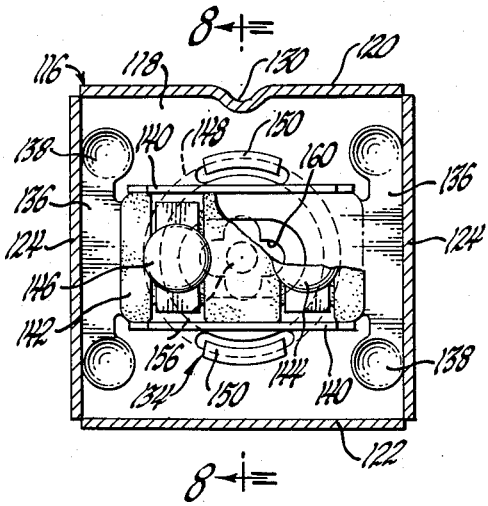
FIGURE 9 is a view, partly in section and partly broken away to illustrate certain details, taken on line 9—9 of FIGURE 8.
Figure 10:
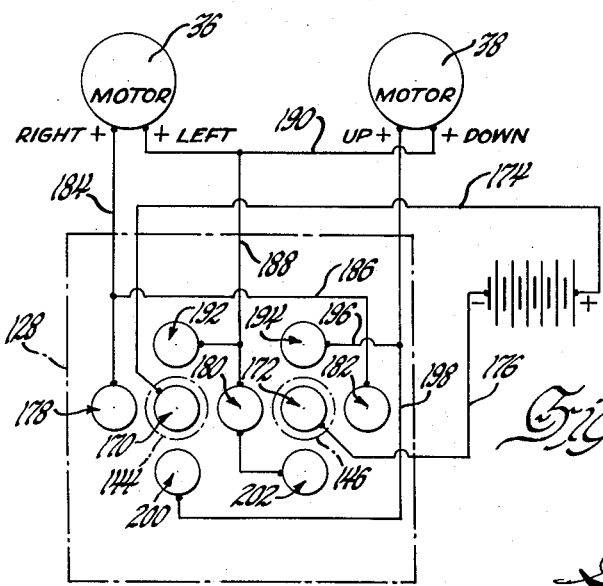
FIGURE 10 is a schematic view of the electrical circuitry of the switch actuator of FIGURES 8 and 9, and the electrical connections to the mirror assembly.

Referring now particularly to FIGURES 8 and 9, the actuator switch mechanism may be seen to include a contact housing 116 comprising a base wall 118 terminating in integral projecting upper, lower and side walls 120, 122 and 124, respectively, forming a continuous rectangular housing side wall. Radially inwardly bent tangs 126 retain a terminal base or contact plate 128, fabricated of suitable insulating material, within the housing in abutment with an inward depression or projection 130 in the upper housing wall 120. A plurality of rivet-like contacts, described more fully hereinafter with respect to FIGURE 10, are fixedly secured in the terminal base 128 and are variously connected to an electrical power source and the mirror assembly 6. An insulating plate 132 is interposed between the side wall of the housing 116 and the plate 128, and includes suitable apertures for the spaced rivet-type contacts.

A contact carrier member 134 includes oppositely disposed parallel arm 136, each having at its opposite ends button-like bearing members 138 slidably abutting the base wall 118 of the housing 116. The upper and lower portions 140 of the carrier wall intermediate the arms 136 are bent away from the bearing arms to form a receptacle for contact support block 142 made of a suitable insulating material. A pair of substantially U-shaped bridging contact members having contact heads 144 and 146 are axially movably mounted in predetermined spaced relation within recesses in the contact support block 142, a spring 149 being associated with each contact member.

As a result, the bridging contacts are continuously urged into sliding abutting engagement with the insulating plate 132 for movement into bridging engagement with various groups of the fixed contacts on plate 128 as will appear hereinafter.

It will be noted that the carrier member 134 is closely confined between side walls 124 of the housing 116 so as to be movable along a single axis toward or away from the upper and lower housing walls 120 and 122. On the other hand, the contact support block 142 is confined with respect to carrier member 134 for movement along a second single axis in either direction with respect to the spaced housing side walls 124. As a result, upon movement of the carrier member 134 in what is a vertical direction in the installation shown, the movable bridging contacts 144 and 146 are translated therewith, while the contact support block 142 and the bridging contacts 144 and 146 may be translated relative to the carrier member along an axis at right angles to the axis of movement of the carrier member 134. Upon so moving the contact support member 142 along either of the aforementioned axes, it will be apparent that the bridging contacts 144 and 146 cannot be inadvertently rotated about a longitudinal axis through the switch assembly thereby maintaining the bridging contacts in a predetermined position relative to the fixed contacts on plate 128.

An actuator housing 148 includes a plurality of spaced fingers 150 projecting through suitable apertures in the base wall 118 of the switch housing 116, and are turned radially outwardly to secure the two housings together. The exterior surface of the actuator housing 148 is threaded to receive a pair of lock nuts adapted to secure the entire actuator assembly to a suitable support panel 152 fixed within the interior of the vehicle passenger compartment. An externally operable actuator rod 154 extends into and through the actuator housing 148, and terminates in a ball-head 156 seated in a suitable socket 158 substantially centrally located within the contact support block 142. The opening 160 in base wall 118 of the switch housing 116, through which rod 154 extends, is of cloverleaf configuration. As a result, the actuator rod 154 is confined for movement substantially along either of two axes at right angles to each other.

At the open end of the actuator housing 148 through which the actuator 154 extends, there is formed a radially inwardly projecting annular shoulder 162 against which a similar shoulder of retaining cup 164 is seated. A radial shoulder 166 on rod 154 is continuously urged toward its seat on the shouldered cup 164 by an axially coiled self-centering spring 168 mounted within the actuator housing in abutment with base wall 118 and the actuator rod shoulder 166. The self-centering spring 168 permits manipulation of actuator rod 154 from the normal or rest position of FIGURE 8 to a circuit closing position to adjust the mirror position. Thereafter, upon the mirror reaching its desired adjusted position, the actuator 154 may be released thereby being automatically returned to its centered circuit-open position by means of the self-centering spring.

Reference will now be made to FIGURE 10 with respect to the disposition of the aforementioned fixed rivet-type contacts on terminal plate 128, their connections to the respective motor armatures 36 and 38, and their cooperation with the movable bridging contact members 144 and 146 of the switch actuator mechanism 10. Moreover, in order to facilitate understanding of the switch structure, the following description will be made with reference to the disposition of the actuator mechanism as shown in FIGURE 8; that is, with the bridging contacts 144 and 146 disposed in a substantially horizontal plane. However, it will be appreciated that the actuator may be mounted in any position dictated by convenience.

In FIGURE 10, there are shown two horizontally spaced rivet-type contacts 170 and 172 secured to the terminal plate 128 and respectively connected by the conductors 174 and 176 to the positive and negative sides of a suitable power source such as a vehicle battery. Horizontally spaced between and to either side of these contacts are the three fixed contacts 178, 180 and 182. Contacts 178 and 182 are connected in parallel by conductors 184 and 186 to one end of the winding for motor armature 36 which drives screw 82 to adjust the mirror to the right and toward or to the left and away from the vehicle passenger compartment with reference to FIGURE 2. The contact 180 is connected in parallel with the other end of the winding of motor armature 36 and one end of the winding of motor armature 38 by conductors 188 and 190.

Disposed directly above the respective contacts 170 and 172 are the horizontally spaced and fixed contacts 192 and 194. Contact 192 is connected by the aforementioned conductors 188 and 190 to one end of the winding of motor armature 38 which drives screw 84 to adjust the mirror up or down with reference to FIGURE 2. Contact 194 is connected by conductors 196 and 198 to the other end of the winding of armature 38.

In similar fashion, the horizontally spaced fixed contacts 200 and 202 are disposed directly below the contacts 170 and 172. Contact 200 is connected by conductor 198 to the end of winding of armature 38 opposite the connection of contact 192, while contact 202 is connected by conductors 188 and 190 to the end of the winding of armature 38 opposite the connection of contact 194.

The movable bridging contacts 144 and 146, of relatively larger diameter than the fixed contacts aforedescribed, are normally maintained in the position indicated in FIGURE 10 by the self-centering spring 168; that is, these movable contacts normally overlie the contacts 170 and 172 thereby maintaining the circuits through the armatures open. However, upon movement of the actuator rod 154 either in a vertical or horizontal plane, the movable contact members are adapted to bridge between the contacts 170 and 172 and a selected pair of the fixed contacts aforedescribed. The cooperative functioning of the movable contacts with respect to fixed contacts will be apparent from a description of the operation of the mechanism of this invention which follows.

Figure 2:
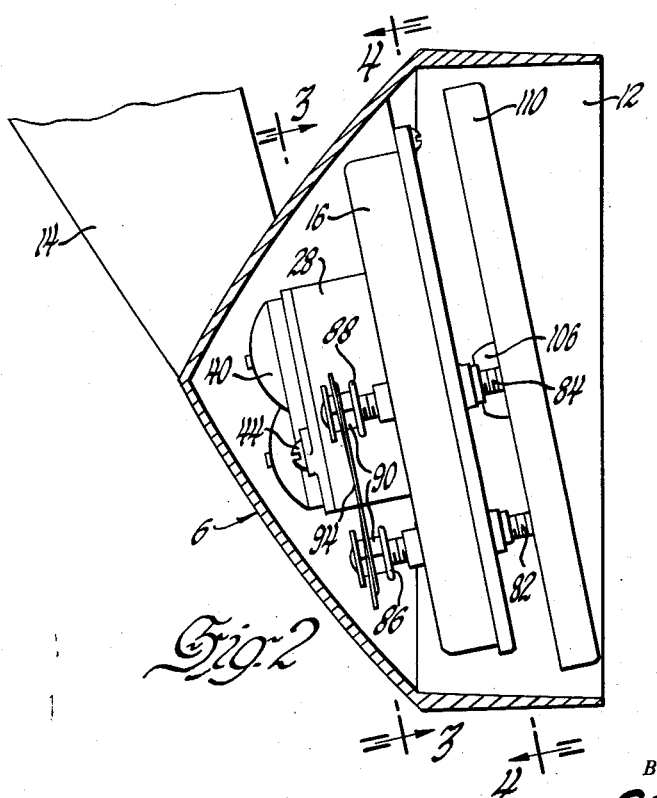
FIGURE 2 is an enlarged view, partly in section, of the mirror assembly in FIGURE 1.

In operation, the mirror mechanism may be assumed to be in the position of FIGURE 2 which is a position of rest. At this time, the drive screws 82 and 84 are stationary thereby defining two spaced points of support for the mirror backing plate 104 which, together with the influence of the spring plate member 12 defining a third point of support, establish a selected plane of mirror adjustment. As long as the actuator switch 10 remains in the position of FIGURE 8 in which the movable bridging contact members 144 and 146 overlie the contacts 170 and 172 connected to the vehicle battery, no power is transmitted to either of the motor armatures 36 or 38. If it is desired to adjust the position of the face of the mirror element 108, one or the other or both of the drive screws 82 and 84 are selectively reciprocated forwardly or rearwardly to establish a new plane of adjustment of the mirror face. Upon a selected mirror position being obtained, the actuator rod 154 is released, and the centering spring 168 immediately places the actuator switch mechanism in the position of FIGURE 8 whereby the contacts are disposed as shown in FIGURE 10 thereby interrupting the electrical circuit to the armature which has been energized. In this regard, and as will be apparent as the description of the operation of the invention continues, the actuator switch mechanism of FIGURE 8 is so disposed within the vehicle compartment and with reference to the location of the fixed contacts on the terminal plate 128 that movement of the mirror will correspond to the direction of movement of the actuator rod. In other words, if it is desired to move the mirror face to the right, the actuating rod 154 will be moved to the right in a horizontal plane, and if it is desired to tilt the mirror face up, the actuator handle would be moved upwardly in a vertical plane, and likewise for mirror adjustments to the left and down.

With the mirror assembly disposed in the position of FIGURE 2, the plane of the mirror element may be adjusted to the right or toward the vehicle passenger compartment about the pivot member 100 in the following manner: The actuator rod 154 is moved to the right in a horizontal plane resulting in the movable contact 144 bridging contacts 170 and 178, while the other movable contact 146 similarly bridges the contacts 180 and 172. At this time, current flows from the positive side of the battery through conductor 174, fixed contact 170, movable contact 144, fixed contact 178 and the conductor 184 to the winding of the armature 36. The circuit is continued through the conductors 190 and 188, fixed contact 180, movable contact 146, fixed contact 172, and through the conductor 176 to the negative or ground side of the battery. As a result, the drive train driven by armature 36 rotates drive wheel 66 in a direction to reciprocate the drive screw 82 axially outwardly to pivot the mirror to the right. During this operation, the armature 38 is not energized since there is no circuit therethrough.

If it is desired to pivot the mirror element of FIGURE 2 to the left by retracting the drive screw 82 which requires rotation of the armature 36 in a direction opposite to that aforedescribed, the actuator rod 154 is moved to the left in a horizontal plane thereby moving the contacts 144 and 146 into bridging contact between contacts 170 and 180 and 172 and 182, respectively. The positive side of the battery is now connected through the fixed contact 180 and conductors 188 and 190 to the opposite end of the winding of armature 36 thereby resulting in rotation of the motor in a direction opposite to that previously described with respect to mirror adjustment to the right. The circuit is completed through contact 182. During this leftward mirror adjustment, the armature 38 is not energized since no circuit is made therethrough.

To adjust the mirror face downwardly, the actuating handle 154 is moved downwardly in a vertical plane thereby resulting in movable contacts 144 and 146 respectively bridging the pairs of contacts 170 and 192 and 172 and 194. As a result, the positive side of the battery is connected through the contact 192 and conductors 188 and 190 to one end of the winding of armature 38 to rotate the latter in one direction, the circuit being completed through conductors 198 and 196, fixed contact 194, movable contact 146 and fixed contact 172. As a result, drive wheel or gear 78 is rotated in one direction to extend drive screw 84 to tilt the mirror face downwardly. During this adjustment, no current may flow through the horizontal adjustment armature 36 since no connection to ground is provided.

In similar fashion, the mirror face may be tilted upwardly by moving the actuator handle of FIGURE 8 upwardly in a vertical plane thereby causing the movable contacts 144 and 146 to bridge between the respective pairs of contacts 170 and 200 and 172 and 202. As a result, the positive side of the battery is connected through the contact 200 and conductor 198 to the opposite end of the winding of the armature 38 thereby rotating the latter in the opposite direction to retract drive screw 84 to tilt the mirror upwardly. The armature winding is grounded through conductors 190 and 188 and fixed contact 202. Again, no current may flow to armature 36 since a complete circuit therethrough is not made.

Upon the mirror face reaching the position desired by the vehicle operator after any one of the adjustments aforedescribed, the operator merely releases the actuator rod 154 which is then automatically returned rapidly to its normal position indicated in FIGURE 8 by the self-centering spring 168. As a result, the contacts are disposed as indicated in FIGURE 10 which is the circuit-open position, thereby interrupting actuation of the electrical motors. The mirror is then retained in the selected adjusted position until such time as subsequent adjustment is required.

With respect to the above description of operation of the mechanism, and particularly that of the switch actuator shown in FIGURES 8 and 9, particular note should be made of the function of the carrier member 134 and contact support member or block 142. The aforementioned carrier member and contact support member function in cooperation with each other to always maintain the movable contacts 144 and 146 in a predetermined disposition with respect to each other and the spaced fixed contacts on terminal or base plate member 128. To this end, and as appears more clearly in FIGURE 9, the carrier member 134 is closely confined between the laterally or horizontally spaced side walls 124 of rectangular switch housing 116 so as to be movable only in a vertical plane. The contact support member or block 142 is confined on the carrier member 134 so as to be movable only in a horizontal plane or at right angles to movement of the carrier member. The actuator rod 154 is mounted by means of the ball head 156 within the socket 158 of the contact support member 142 whereby pivoting the actuator rod 154 in a vertical plane results in vertical movement of the contact support member 142 with the carrier member 134. As a result, the movable contact members 144 and 146 are maintained in a predetermined disposition for cooperation with respective pairs of fixed contacts 192 and 194 or 200 and 202 for controlling mirror adjustment either downwardly or upwardly, respectively. On the other hand, the actuator rod 154 may be pivoted in a horizontal plane to move the contact support block 142 relative to the carrier member 134 which, in these circumstances, remains stationary due to its confinement within the switch housing. Again, the movable contacts 144 and 146 are maintained in their predetermined disposition for cooperation with various pairs of the contacts 178, 180 and 182 to control mirror adjustment to the right and left. Moreover, the cloverleaf configuration of the aperture 160 in the base wall 118 of the switch housing restricts actuator rod movement substantially to the axes or planes aforementioned, thereby avoiding any danger of one or the other motor armatures being short circuited. For example, if the actuator rod could be moved to any substantial degree diagonally of the switch housing, the movable contact 144 might bridge the fixed contacts 170 and 180 while the movable contact 146 would bridge the fixed contacts 202 and 172 thereby resulting in a short.

Having disclosed a preferred embodiment for the purpose of illustration, it is to be understood that the invention is not to be limited thereby but only by the claims which follow.

We claim:

1. A remotely controlled mirror mechanism comprising a support, a mirror assembly adjustably mounted on said support, plural spaced gear means rotatably mounted on said support, plural actuated means threadably received in respective ones of said gear means for axial movement relative thereto upon rotation thereof and operatively connected to said assembly, electric motor means mounted on said support and operatively drivingly connected to said gear means, and selectively operable actuator switch means electrically connected to said motor means for energizing the latter.

2. A remotely controlled mirror mechanism comprising a support, a mirror assembly adjustably mounted on said support, plural spaced gear means rotatably mounted on said support, plural actuated means threadably received in respective ones of said gear means for axial movement relative thereto upon rotation thereof and operatively connected to said assembly, clutch means operatively connected to said plural actuated means restraining rotation of the latter with said gear means, electric motor means mounted on said support and operatively drivingly connected to said gear means, and selectively operable actuator switch means electrically connected to said motor means for energizing the latter.

3. A remotely controlled mirror mechanism comprising a support, a mirror assembly adjustably mounted on said support, plural spaced gear means rotatably mounted on said support, plural actuated means threadably received in respective ones of said gear means for axial movement relative thereto upon rotation thereof and operatively connected to said assembly, stop means limiting axial movement of said actuated means, automatically releasable clutch means operatively connected to said plural actuated means normally restraining rotation of the latter with said gear means and releasable to permit rotation of said actuated means with said gear means upon engagement of said stop means, reversible electric motor means mounted on said support and operatively drivingly connected to said gear means, and selectively operable actuator switch means electrically connected to said motor means for energizing the latter.

4. A remotely controlled mirror mechanism comprising a support, a mirror assembly adjustably mounted on said support, plural spaced gear means rotatably mounted on said support, plural actuated means threadably received in respective ones of said gear means for parallel axial movement relative thereto upon rotation thereof and engaging said assembly at spaced points thereon, yieldable means on said support engaging said assembly and continuously urging the latter into engagement with said actuated means, stop means limiting axial movement of said actuated means, automatically releasable clutch means operatively connected to said plural actuated means normally restraining rotation of the latter with said gear means and releasable to permit rotation of said actuated means with said gear means upon engagement of said stop means, reversible electric motor means mounted on said support and operatively drivingly connected to said gear means, and selectively operable actuator switch means electrically connected to said motor means for energizing the latter.

5. A remotely controlled mirror mechanism comprising a support, a mirror assembly, means mounting said mirror assembly on said support for universal adjustment relative to the latter, a plurality of spaced gears rotatably mounted on said support, a drive screw threadedly received within each of said gears and operatively connected to said assembly, spring clutch means engaging said drive screws preventing the latter from rotating with their respective gears whereby said screws are translated axially upon rotation of said gears, axially spaced stops on each of said drive screws limiting axial movement of the latter upon abutment with said support, said spring clutch means being automatically releasable upon engagement of one of said stops to permit rotation of said drive screws with respect to gears, drive means operatively connected to said gears and including reversible electric motor means mounted on said support, and selectively operable actuator switch means electrically connected to said motor means for energizing the latter.

6. A remotely controlled mirror mechanism comprising a support, a mirror assembly, means mounting said mirror assembly on said support for universal adjustment relative to the latter, a plurality of spaced gears rotatably mounted on said support, a drive screw threadably received within each of said gears and engageable with said mirror assembly at spaced points, a wire spring clutch engaging said drive screws preventing the latter from rotating with their respective gears whereby said screws are translated axially in parallel paths upon rotation of said gears, yieldable means continuously urging said mirror assembly into engagement with said drive screws, axially spaced stops on each of said drive screws limiting axial movement of the latter, said wire spring clutch being automatically releasable upon engagement of one of said stops to permit rotation of said drive screws with respect to gears, drive means operatively connected to said gears and including reversible electric motor means mounted on said support, and selectively operable actuator switch means electrically connected to said motor for energizing the latter.

7. In the structure as defined in claim 6, said electric motor means comprising a motor cavity, a pair of oppositely disposed pole shoes, a single permanent bar magnet seated between said pole shoes, and an armature rotatably supported within said cavity on each side of said magnet.

References Cited in the file of this patent

UNITED STATES PATENTS

| | | | |
|---|---|---|---|
| 2,656,764 | Johnson | Oct. | 27, 1953 |
| 2,686,233 | Obszarny | Aug. | 10, 1954 |
| 2,718,175 | Gim | Sept. | 20, 1955 |
| 2,758,508 | Petri et al. | Aug. | 14, 1956 |
| 2,793,259 | Parsons | May | 21, 1957 |
| 2,855,825 | Feder | Oct. | 14, 1958 |
| 2,871,761 | Snyder | Feb. | 3, 1959 |
| 2,877,686 | Foster | Mar. | 17, 1959 |